Patented Apr. 2, 1929.

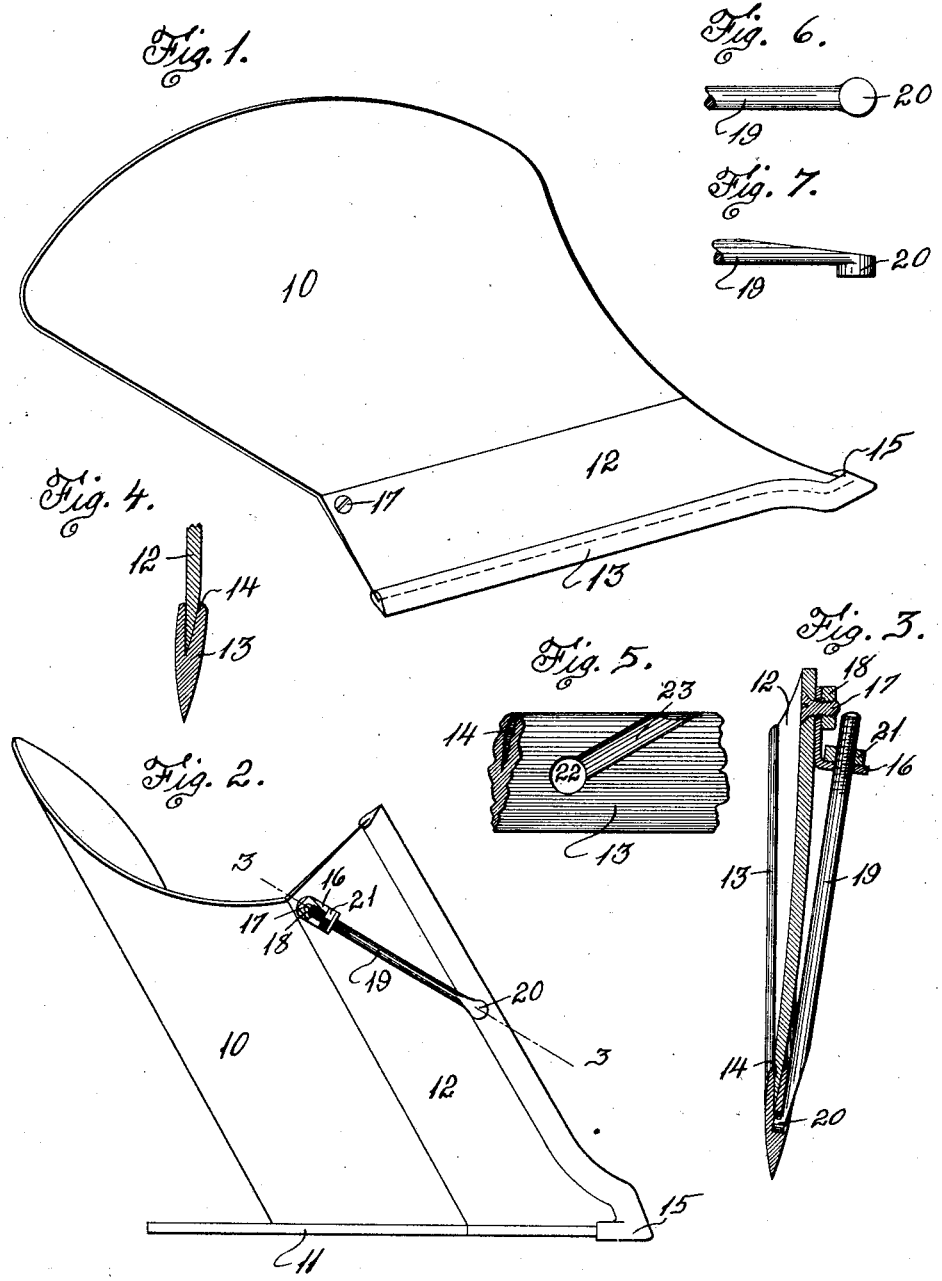

1,707,426

UNITED STATES PATENT OFFICE.

ELMER STEPHEN BAKER, OF JOLLEY, IOWA, ASSIGNOR OF ONE-HALF TO K. M. MOORE, OF ROCKWELL CITY, IOWA.

SUPPLEMENTAL PLOWSHARE.

Application filed July 28, 1927. Serial No. 208,979.

An object of this invention is to provide an improved share for plows.

A further object of the invention is to provide a plow share having a supplementary attachable and detachable cutting edge.

A further object of the invention is to provide improved means for attaching a supplementary edge to a plow share.

A further object of the invention is to provide a supplementary cutting edge adapted for attachment to and rehabilitation of dull and worn plow shares.

My invention consists in the construction, arrangement and combination of elements hereinafter set forth, pointed out in my claims and illustrated by the accompanying drawing, in which—

Figure 1 is a side elevation of a conventional moldboard plow with my improvement in place for practical use. Figure 2 is a bottom view of a conventional moldboard plow showing my improvement in place and the method of attachment, the conventional frog of the plow being omitted. Figure 3 is a detail section, on an enlarged scale, on the indicated line 3—3 of Figure 2. Figure 4 is a detail, fragmentary section, on an enlarged scale, of my supplementary cutting edge and a portion of the edge of a plow share. Figure 5 is a detail, fragmentary view, on an enlarged scale, of a portion of my supplementary cutting edge and attaching means carried thereby. Figure 6 and Figure 7 are views at right angles to one another and on an enlarged scale, of one end of the attaching member carried by the plow share.

In the construction of my device as shown, the numeral 10 indicates the moldboard of a conventional plow having a landside 11. A share 12 is formed to fit to and form an extension of the moldboard 10 and landside 11 and is adapted to be secured thereto in any desired manner, all of which is common in the art and well known. The share 12 is formed with an entering point or wedge and the edge of the share adapted to engage the ground is tapered to form a cutting edge. A supplementary cutting edge 13 is preferably formed by forging or the like and comprises a strip of metal of greater width than thickness having a tapered groove 14 opening throughout the length of one edge and the edge opposite said groove tapered to form a thin knife or cutting edge. The supplementary edge 13 is curved to conform to the contour of the cutting edge of the share 12 and is recurved about the entering point of said share and under the point of the landside formed on the share, thus forming a socket as indicated at 15. A bracket 16, formed of a strip of metal bent to substantially a right angle and formed with apertures in each of its legs, is secured to the rear face of the share 12 adjacent the rear edge of said share and spaced from the cutting edge thereof by means of a flathead bolt 17 countersunk through said share, a nut 18 on said bolt bearing against the bracket 16 and locking said share and bracket together. A pull-rod 19 is formed with one threaded end and an offset circular head 20 having its axis at right angles to the axis of said rod on the other end and is adapted to be mounted loosely through the aperture in the projecting leg of the bracket 16, the threaded end being adjacent said bracket and supporting an adjusting nut 21 bearing against said leg. The supplementary edge 13 is formed with a circular recess 22 substantially midway of its edges and intermediate its ends, said recess being adapted to receive the off-set head 20, a groove 23 connecting said recess with the grooved edge of the supplementary edge 13 to accommodate that portion of the rod 19 adjacent the head 20 and permit said head to be fully engaged within said recess. The rod 19 is flattened on the side opposite the head 20 so that it does not project beyond the extended plane of the adjacent side of the supplementary edge 13. With the edge of the share 12 seated in the groove of the supplementary edge 13, the nut 21 is loosened, the head 20 pressed into the recess 22 and the nut 21 drawn up tightly, which draws the edge 13 tightly against the share and holds it firmly in position.

My improvement is particularly adapted for the rehabilitation of worn shares, as it is readily attached to the types of plow shares now in use and serves to prolong the usefulness of such shares. However, a desirable economy can be effected by the use of my improvement with new plows, since the supplementary edge obviates the necessity of removing the plow share when sharpening is necessary and permits continuing use of the plow through the attaching of a new edge which may be accomplished in the field in a very few minutes and with the use of simple tools.

Since many slight changes of form or structure are possible without departing from the spirit of my invention, I wish to be understood as being limited only by the scope of the appended claims.

I claim as my invention—

1. A plow share formed with a point and a cutting edge, a supplementary attachable and detachable cutting edge formed with a longitudinal marginal groove adapted to receive the cutting edge of said share, and means carried by said share for interconnecting said supplementary edge and share, said means comprising a bracket carried by said share and a bolt connecting said bracket and supplementary edge.

2. A plow share formed with a point and a cutting edge, a supplementary attachable and detachable cutting edge, comprising a strip formed with a groove on one edge adapted to receive the cutting edge of said share, a cutting edge opposite said groove and a recurved end portion adapted to receive the point of said share, together with means carried by said share whereby said supplementary edge may be mounted on and drawn upwardly and rearwardly against said point and the cutting edge of said share.

3. In a plow having a share formed with a point and a cutting edge, a supplementary attachable and detachable edge formed with a groove adapted to receive the edge of said share and a socket adapted to receive said point, a cutting edge opposite said groove and means carried by said share and engaging said supplementary edge whereby said supplementary edge may be drawn upwardly and rearwardly against said point and the edge of said share.

4. In a plow having a share and a supplementary attachable and detachable edge therefor, means for interconnecting said share and supplementary edge, said means comprising an angular bracket on said share, a rod adjustably mounted through the projecting leg of said bracket, an offset head on said rod and a recess in said supplementary edge adapted to receive said offset head.

5. A supplementary edge for plow shares comprising a strip of relatively greater width than thickness, a groove on one edge of said strip, a cutting edge opposite said groove, a socket adjacent one end of said strip adapted to receive the point of a plow share and a recess in one side of said strip intermediate its ends adapted to receive the offset head of a bolt.

6. In a device of the character described, means for interconnecting a plow share and a supplementary cutting edge, said means comprising a bracket on said share, a rod passing loosely through said bracket, a nut threaded on said rod and adapted to bear against said bracket, an offset head on said rod and a recess in said supplementary edge adapted to receive said head.

ELMER S. BAKER.